(12) United States Patent
Carter et al.

(10) Patent No.: US 6,600,814 B1
(45) Date of Patent: Jul. 29, 2003

(54) METHOD, APPARATUS, AND COMPUTER PROGRAM PRODUCT FOR REDUCING THE LOAD ON A TEXT-TO-SPEECH CONVERTER IN A MESSAGING SYSTEM CAPABLE OF TEXT-TO-SPEECH CONVERSION OF E-MAIL DOCUMENTS

(75) Inventors: Paul L. Carter, Wellington (NZ); Sachin Shangarpawar, Wellington (NZ)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/406,155

(22) Filed: Sep. 27, 1999

(51) Int. Cl.[7] .............................................. H04M 1/64
(52) U.S. Cl. ............................ 379/88.16; 379/88.14; 704/260; 709/206
(58) Field of Search ...................... 379/88.06, 88.09, 379/88.13, 88.14, 88.16, 88.17, 88.22, 88.23, 88.25, 88.27, 88.28, 93.01, 93.17, 93.24; 704/200, 258, 260; 709/200, 204, 206

(56) References Cited

U.S. PATENT DOCUMENTS

| 5,351,276 | A | * | 9/1994 | Doll et al. ................... 370/354 |
| 5,479,411 | A | | 12/1995 | Klein |
| 5,528,739 | A | | 6/1996 | Lucas et al. |
| 5,530,740 | A | | 6/1996 | Irribarren et al. |
| 5,715,370 | A | * | 2/1998 | Luther et al. ............... 704/260 |
| 5,737,395 | A | | 4/1998 | Irribarren |
| 5,740,230 | A | | 4/1998 | Vaudreuil |
| 5,742,668 | A | | 4/1998 | Pepe et al. |
| 5,742,905 | A | | 4/1998 | Pepe et al. |
| 5,799,063 | A | * | 8/1998 | Krane ...................... 379/88.04 |
| 5,799,267 | A | | 8/1998 | Siegel |
| 5,825,854 | A | * | 10/1998 | Larson et al. ............ 379/88.13 |
| 5,835,087 | A | | 11/1998 | Herz et al. |
| 5,848,295 | A | | 12/1998 | Anderson et al. |
| 5,867,495 | A | | 2/1999 | Elliott et al. |
| 5,881,135 | A | | 3/1999 | Watts et al. |
| 5,881,233 | A | | 3/1999 | Toyada et al. |
| 5,911,776 | A | * | 6/1999 | Guck ...................... 707/104.1 |
| 6,353,661 | B1 | * | 3/2002 | Bailey, III ............... 379/88.17 |
| 2002/0078300 | A1 | * | 6/2002 | Dharap ....................... 711/133 |

OTHER PUBLICATIONS

Network Services Platforms, CO Access™, internet site: http://www.bostontechnology.com/prodserv/nsp–co.htm, p. 1–2.

* cited by examiner

Primary Examiner—Fan Tsang
Assistant Examiner—Roland G. Foster
(74) Attorney, Agent, or Firm—Michael B. Atlass; Mark T. Starr

(57) ABSTRACT

A messaging system comprises a storage unit for storing e-mail messages, a text-to-speech converter for converting the different text segments of e-mail messages into speech signals for playback to a user via a telephone handset, and a cache for storing the speech signals of selected ones of previously converted text segments. Upon a subsequent request by a user to convert the text segments of a new e-mail message to speech signals for playback via a telephone handset, the speech signals of previously converted text segments that are identical to any text segments of the new e-mail message are played back from the cache thus avoiding the need for the text-to-speech converter to convert those text segments of the new e-mail message to speech. The load on the text-to-speech converter is thereby reduced.

14 Claims, 3 Drawing Sheets

METHOD, APPARATUS, AND COMPUTER PROGRAM PRODUCT FOR REDUCING THE LOAD ON A TEXT-TO-SPEECH CONVERTER IN A MESSAGING SYSTEM CAPABLE OF TEXT-TO-SPEECH CONVERSION OF E-MAIL DOCUMENTS

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to messaging systems, and more particularly, to a messaging system that provides text-to-speech conversion of e-mail documents for playback to a caller over a telephone connection to the system.

BACKGROUND

Electronic mail, or "e-mail", has become an almost ubiquitous form of communication. Corporate computer networks have for some time provided e-mail services to the employees of many corporations. With the advent of the Internet, millions of home computer users now have access to e-mail services. Recognizing that e-mail users may not always have ready access to their computers, which is the primary means by which users retrieve e-mail messages, many messaging system vendors have begun to provide access to e-mail messages from a telephone handset. Using a text-to-speech converter and an interface to a telephone network, such as the Public Switched Telephone Network (PSTN) or a private branch exchange (PBX), these messaging systems enable a user to dial-in to the system from a standard telephone and to have the text of an e-mail message played back to the user over the telephone handset. With this capability, e-mail users can retrieve their e-mail messages from virtually anywhere.

U.S. Pat. No. 5,715,370 discloses a system for extracting selectable fields of text from various structured data files, including e-mail message files, and then feeding the extracted text data to a text-to-speech converter so that the selected text can be played back to a user over a telephone handset. A personal computer user, for example, can use this system to telephone a personal computer and then listen to portions of e-mail messages and other files that have been converted to speech by the text-to-speech converter.

U.S. Pat. No. 5,825,854 discloses a telephone access system for accessing a computer through a telephone handset. Audio instructions are provided to the user to select between a plurality of audio dialogs. An audio dialog may provide access to voice mail, electronic mail, facsimiles, or other data stored on the computer. Within an audio dialog, the user is provided with instructions and controls that allow the user to remotely manipulate the information stored in the computer from the telephone handset. For example, the system can allow the user to listen to an e-mail message that has been converted from text to speech, and then to reply to the message.

U.S. Pat. Nos. 5,530,740 and 5,737,395 both disclose universal messaging systems that integrate a voice and facsimile messaging system with an e-mail messaging system via a network. The integrated systems are capable of converting text messages, such as e-mail messages, into voice messages for playback over a telephone handset.

U.S. Pat. No. 5,479,411 discloses another universal messaging system that integrates voice, facsimile, and e-mail messaging and that converts portions of e-mail messages into voice messages for playback over a telephone handset.

In all of the foregoing systems, the load on the text-to-speech converter that converts the e-mail messages into speech can be significant, particularly in larger messaging systems that support simultaneous access by hundreds and even thousands of users. Consequently, there is a need for methods and apparatus that help to reduce the load on the text-to-speech converter in these systems. The present invention satisfies this need.

SUMMARY OF THE INVENTION

The present invention is directed to a method, apparatus, and computer program product for reducing the load on a text-to-speech converter in a messaging system in which e-mail messages are converted to speech for playback to a user over a telephone handset.

A messaging system in accordance with the present invention comprises a storage unit for storing e-mail messages, a text-to-speech converter for converting the different text segments of e-mail messages into speech signals for playback to a user via a telephone handset, and a cache for storing the speech signals of selected ones of previously converted text segments. Upon a subsequent request by a user to convert the text segments of a new e-mail message to speech signals for playback via a telephone handset, the speech signals of previously converted text segments that are identical to any text segments of the new e-mail message are played back from the cache thus avoiding the need for the text-to-speech converter to convert those text segments of the new e-mail message to speech. The load on the text-to-speech converter is thereby reduced.

A method of the present invention, for use in a messaging system that comprises a storage unit for storing e-mail messages, each comprising a plurality of different text segments, and a text-to-speech converter for converting the text segments of an e-mail message into speech signals for playback to a user via a telephone handset, comprises (i) storing the speech signals of selected ones of previously converted text message segments in a cache, (ii) receiving a request from a user to convert the text segments of a new e-mail message to speech signals for playback to the user over a telephone handset, (iii) comparing a text segment of the new e-mail message to the previously converted text segments for which speech signals are stored in the cache, and (iv) if one of the previously converted text segments matches the text segment of the new e-mail message, playing back the stored speech signal for the previously converted text segment from the cache instead of performing a text-to-speech conversion on the text segment of the new e-mail message.

In one embodiment, only the speech signals of text segments that satisfy a predetermined maximum length requirement are stored in the cache. For example, the predetermined maximum length requirement may be forty (40) characters. In another embodiment, all of the "TO:", "FROM:", "CC:", and "RE:" segments of each e-mail message are cached regardless of length, but a predetermined maximum length requirement (e.g., 40 characters maximum) is still applied to the message bodies. In yet another alternative embodiment, rather than applying a maximum length requirement to the body of the message, each individual sentence of the message body is cached and when the cache approaches its storage capacity, the cached speech signals for longer sentences are discarded first to make room for newly cached sentences. Alternatively, the discard determination can be based on a combination of length and a least recently used algorithm, with a weighting factor arbitrating between the two.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
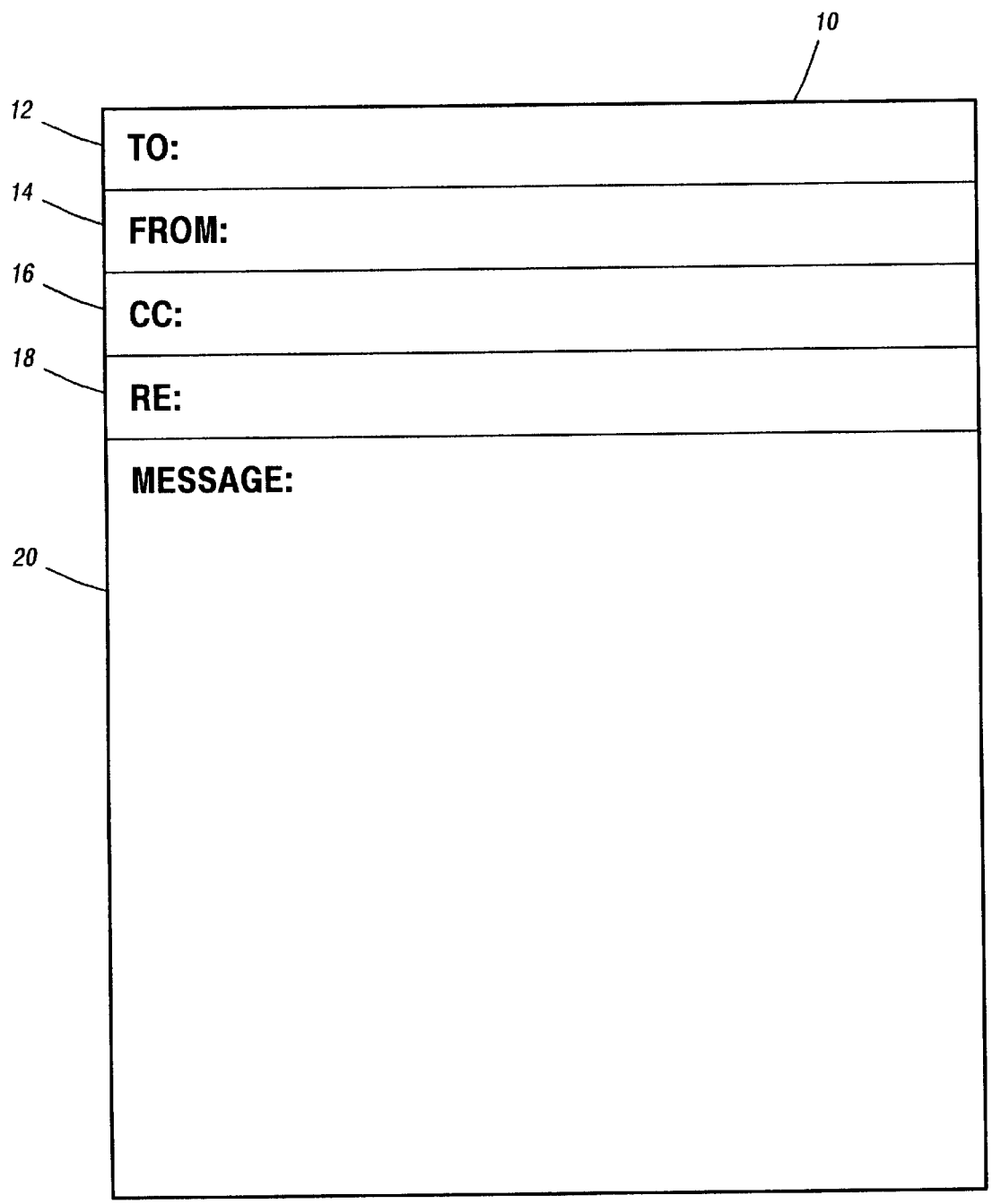
FIG. 1 is a schematic diagram of an exemplary e-mail message comprising a plurality of text segments.

Referring to the drawings, wherein like numerals illustrate like elements throughout, FIG. 1 is a schematic diagram of an exemplary e-mail message 10 comprising a plurality of text segments, including, for example, a "To:" segment 12 that contains text identifying the recipient of the message, a "From:" segment 14 containing text that identifies the sender, a "CC:" segment 16 containing text that identifies others who were copied on the message, a "RE:" segment 18 containing text that identifies the subject of the message, and a "Message:" segment 20 containing the text of the body of the message. Typically, each segment contains alpha-numeric text of the type that can be readily converted from text to speech by a text-to-speech converter. The "To:," "From:," "CC:," and "RE:" segments 10, 12, 14, and 18 are typically of shorter length (in characters) than the segment 20 containing the body of the message.

Figure 2:
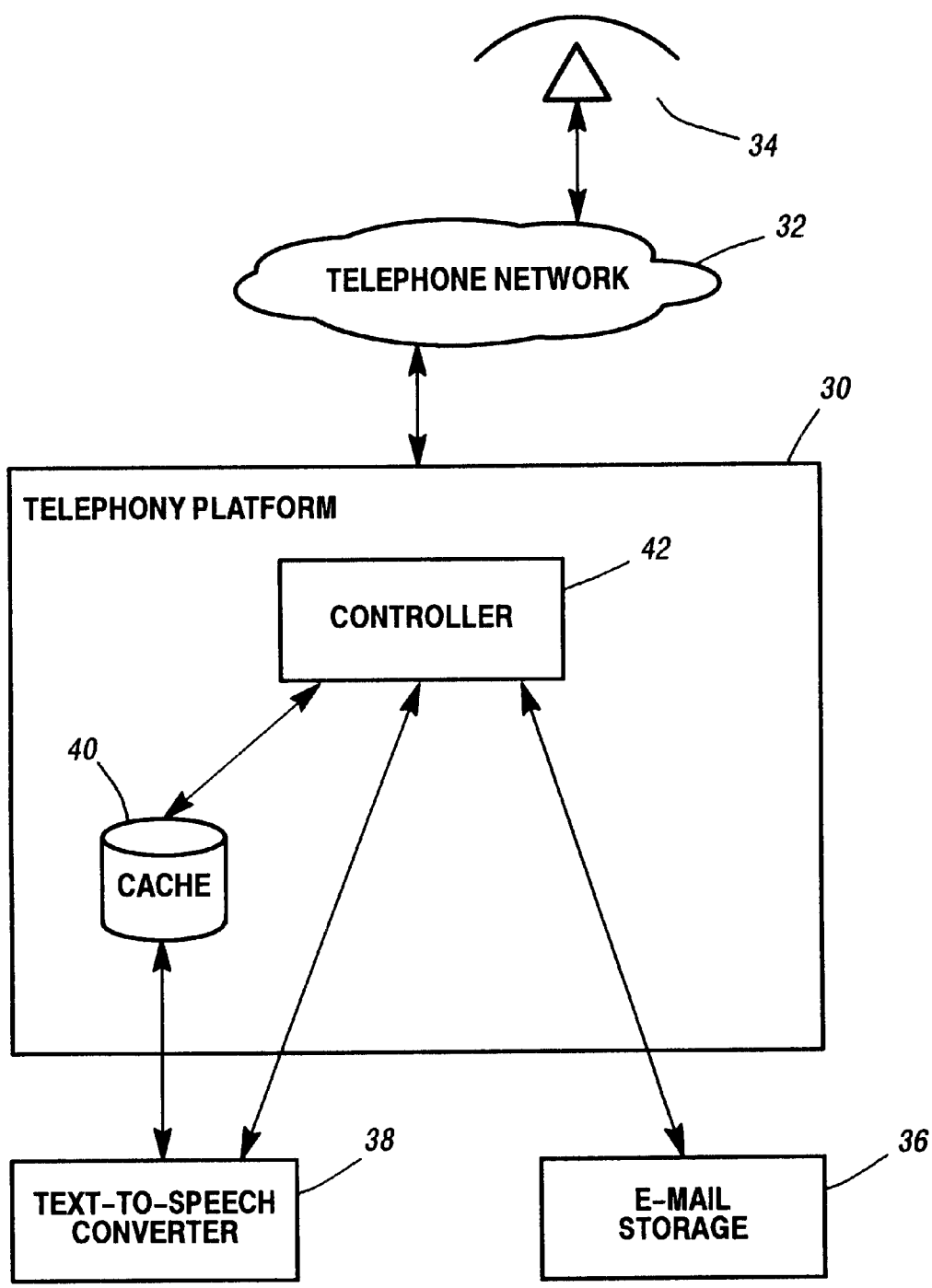
FIG. 2 is block diagram of a messaging system in accordance with the present invention.

FIG. 2 is block diagram of a messaging system in accordance with an embodiment of the present invention. The messaging system comprises an interface that enables a user to access the system from a telephone handset 34. In the presently preferred embodiment, the interface is implemented as part of a telephony platform 30, which interfaces with a telephone network 32, such as the public switched telephone network (PSTN) or a private branch exchange (PBX), to permit users of the system to access the platform 30 from any telephone handset (e.g., telephone handset 34) connected to the telephone network 32. Further according to the present invention, the messaging system comprises a storage unit 36 for storing e-mail messages, a text-to-speech converter 38 for converting the text segments of an e-mail message into speech signals for playback to a user over a telephone handset, and a cache 40 for storing the speech signals of selected ones of previously converted text segments. Upon a request by a user to convert the text segments of a new e-mail message to speech signals for playback via a telephone handset 34, a controller 42 determines whether any of the text segments of the new e-mail message are identical to previously converted text segments for which speech signals are already stored in the cache 40. If so, the stored speech signals of those text segments are played back to the user from the cache, thus avoiding the need for the text-to-speech converter to convert those text segments of the new e-mail message to speech. This reduces the load on the text-to-speech converter. As new text segments are retrieved from the e-mail storage 36 and converted to speech by the text-to-speech converter 38, the controller 42 stores the speech signals of selected ones of the converted text segments in the cache 40. In the presently preferred embodiment, the converted text segments selected for storage in the cache are those that have a length (in characters) that is equal to or less than a predetermined maximum length. For example, text segments that have 40 or fewer characters may be selected for storage in the cache. Thus, the converted speech signals of shorter text segments, which are more likely to be repeated in different e-mail messages, are cached to reduce the load on the text-to-speech converter 38 during playback of subsequent e-mail messages that contain segments with identical text.

In other embodiments, the criteria for selection for storage in the cache 40 may be different. For example, in one alternate embodiment, all text in the "TO:", "FROM:", "CC:", and "RE:" segments 12, 14, 16, and 18 are cached regardless of length, but the predetermined maximum length requirement (e.g., 40 characters maximum) is still applied to the body of the message in the "MESSAGE:" segment 20. In yet another alternative embodiment, rather than applying a maximum length requirement to the "MESSAGE:" segment 20, each individual sentence of the message body is cached and when the cache approaches its storage capacity, the cached speech signals for longer sentences are discarded first to make room for newly cached sentences. Alternatively, the discard determination can be based on a combination of length and a least recently used algorithm, with a weighting factor arbitrating between the two.

In the presently preferred embodiment, in which the interface that enables access to the messaging system from a telephone handset is provided as part of the telephony platform 30, the telephony platform 30 preferably comprises a Network Applications Platform (NAP) manufactured by Unisys Corporation. The NAP is a configuration of hardware and software that provides underlying data and voice processing capabilities through applications running on a host computer. One such application is the Universal Voice Messaging System (UVMS), also available from Unisys Corporation, which is a messaging application that provides voice and fax messaging services to large numbers of users. A network interface unit (not shown) of the NAP provides the interface between a telephone network and applications running on the NAP, such as UVMS. The NAP system is implemented on UNISYS A Series and ClearPath HMP NX computer systems running the MCP operating system. The NAP, as well as tools for developing network applications, such as UVMS, to run on the NAP, are described in greater detail in the following patents and co-pending, commonly assigned patent applications, each of which is hereby incorporated by reference in its entirety:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. patent application Ser. No. 08/944,924, filed Oct. 6, 1997, "Enhanced Multi-Lingual Prompt Management in a Voice Messaging System With Support for Speech Recognition";

U.S. patent application Ser. No. 08/964,744, filed Nov. 5, 1997, "Methods and Apparatus for Providing External Access to Executable Call Flows of a Network Application"; and U.S. patent application Ser. No. 08/987,571, filed Dec. 11, 1997, "Multiple Language Electronic Mail Notification of Received Voice and/or Fax Messages."

Preferably, the e-mail storage unit 36 comprises a hard disk drive in which e-mail messages are stored on magnetic hard disk media. However, in other embodiment, the e-mail storage unit 36 may comprise any suitable storage device, including a removable storage drive, a magnetic tape drive, a re-writable optical disk drive, random access memory (RAM), or any other form of digital data storage. In some embodiments, the e-mail storage unit 36 may comprise part of an e-mail server (not shown) that provides e-mail messaging capabilities to a plurality of subscribers. In that case, the e-mail server is preferably connected to the telephony platform 30 via, for example, a network interface, a small computer systems interface (SCSI) interface, or some other data interface. Alternatively, the e-mail messaging capabilities of the messaging system of the present invention may be implemented as part of the telephony platform 30.

The text-to-speech converter 38 converts text segments of an e-mail message into speech signals that can be played to a user over a telephone handset. The text-to-speech converter may be implemented in hardware, software, or a combination of both. Text-to-speech converters are available from numerous vendors. For example, Lernout & Hauspie Speech Products N.V., Burlington, Mass., 01803, USA provides a line of Text-To-Speech(TTS) Development Tools that provide text-to-speech conversion on a variety of computer and telephony platforms. The converted speech signals can be encoded in any of a variety of formats, including, for example, ADPCM G.721, PCM G.711, or Linear 9 KHz.

In the presently preferred embodiment, the cache 40 is implemented using a hard disk drive (not shown) for storage of the converted speech signals, in combination with a fast lookup mechanism that uses hash indexes stored in a random access memory (RAM) (not shown). More specifically, each text segment for which the converted speech signals are to be cached is hashed to an index that points to the location of its converted speech signals on the hard disk drive. In a most preferred embodiment, the name of the encoding format used to encode the speech signals (e.g., "ADPCM G.721," "PCM G.711," "Linear 9 KHz," etc.) is hashed together with the text of the segment to produce the index. This allows a search of the cache to be based on both the text of a segment and its particular encoding format.

In the presently preferred embodiment, the cache 40 is implemented as part of the telephony platform 30 to provide fast access and playback via the telephony interface to the telephone network 32. In the presently preferred embodiment, in which the telephony platform comprises the Unisys Network Applications Platform (NAP), which also provides voice messaging services, the speech signals for each converted text message are stored in the cache 40 in the form of NAP-compliant voice messages. This format facilitates playback of the speech signals over the telephone network, since the NAP is already designed to playback voice messages. In other embodiment, the format of the stored speech signals may be different.

In the presently preferred embodiment, the controller 42 is preferably implemented in software that runs on the telephony platform 30. However, the controller 42 can be implemented as a separate component of the system and may comprise hardware, software, or any combination thereof. Further details of the operation of the controller 42 are described below with reference to FIG. 3.

Figure 3:
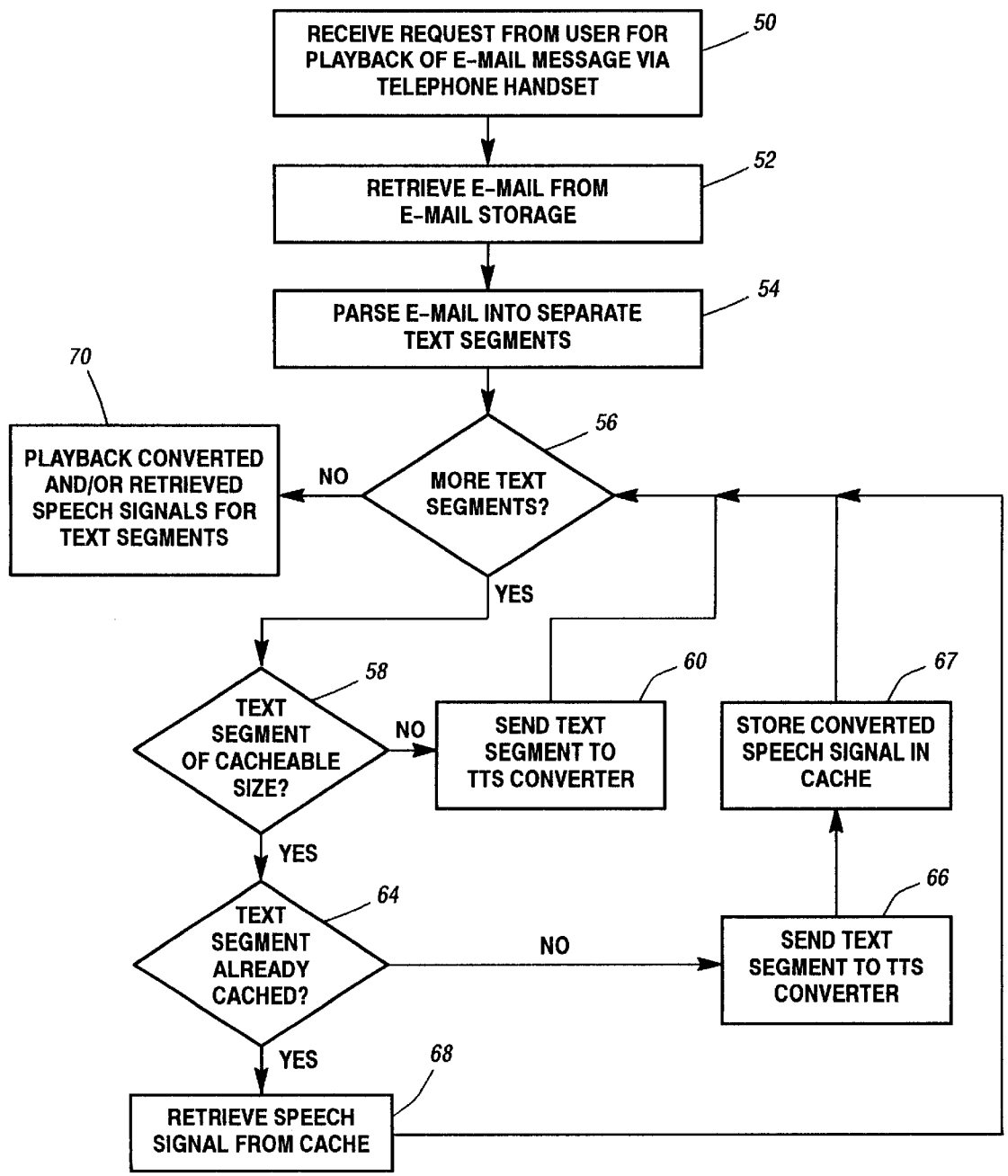
FIG. 3 is a flow diagram illustrating a preferred embodiment of a method of the present invention, as well as illustrating the operation of the messaging system of FIG. 2.

FIG. 3 is a flow diagram illustrating a preferred embodiment of a method of the present invention, as well as providing further details of the operation of the controller 42. At step 50, the controller 42 receives a request from a user to have a particular e-mail message converted to speech and played back to the user over a telephone handset. At step 52, the controller 42 retrieves the requested e-mail from the e-mail storage 36. At step 54, the e-mail message is parsed into its individual text segments (e.g., text segments 12, 14, 16, 18, and 20 of FIG. 1). At step 56, a first text segment is selected for processing. At step 58, the controller 42 determines whether the text segment is cacheable, i.e., whether it may previously have been converted to speech and stored in the cache 40. In the presently preferred embodiment, only those text segments that have a length (in characters) that is equal to or less than a predetermined maximum length, are selected for storage in the cache. For example, the predetermined maximum length may be specified as forty (40) characters, and thus, only text segments that have 40 or fewer characters will be selected for storage in the cache.

If at step 58 it is determined that the current text segment exceeds the predetermined maximum length, and thus is not cacheable, it is immediately forwarded to the text-to-speech converter 38 for conversion to speech. If there are more text segments to be processed, then the next text segment is selected for processing.

If at step 58, it is determined that the current text segment is of a cacheable size, then control passes to step 64. At step 64, the controller 42 performs a cache look-up operation to determine whether the current text segment is identical to any previously converted text segments for which speech signals are already stored in the cache 40. If so, then the cached speech signals are retrieved from the cache. No text-to-speech conversion is needed. Control then passes back to step 56 to begin processing the next text segment.

If at step 64, no match is found in the cache 40 for the current text segment (which has already been determined to be of cacheable size), then at step 66, the text segment is sent to the text-to-speech converter for conversion to speech signals. At step 67, the converted speech signals for this text segment are stored in the cache 40 for use during playback of subsequent e-mails that have identical text segments. Control then passes back to step 56.

Once all of the text segments of the current e-mail message have been processed, control passes from step 56 to step 70. At step 70, the speech signals for each of the text segments (whether newly converted or retrieved from the cache) are played back to the user over the telephone network.

In an alternative embodiment, rather than storing the speech signals of converted text segments in the cache "on-the-fly", as illustrated in steps 66 and 67 of FIG. 3, a more proactive approach is taken. In this approach, incoming e-mail messages are parsed, and any cacheable segments are stored in the cache automatically, without waiting for the recipient to access the message. More specifically, upon arrival of an e-mail message, conversion of any cacheable text segments to speech signals for storage in the cache is scheduled to be performed within a predetermined time period that is based on a prior determination of the average time that it takes the particular e-mail recipient to access her e-mail messages. Thus, in this alternative approach, the goal is to have new cacheable segments stored in the cache before the recipient accesses the message containing those segments.

While the embodiment of the present invention illustrated in FIGS. 2 and 3 is presently preferred, the present invention can be embodied in any messaging system that provides e-mail messaging capabilities and that provides an interface through which users can access the system from a telephone handset. For example, by adding the functionality of the cache 40 and controller 42, the present invention can be implemented in any one of the messaging systems described above in the Background section, all of which already provide an interface for access from a telephone handset, e-mail messaging capabilities, and text-to-speech capabilities. U.S. Pat. Nos. 5,715,370, 5,825,854, 5,530,740, 5,737, 395, and 5,479,411, in which each of these systems is described in detail, are hereby incorporated by reference in their entireties. Additionally, the present invention may be implemented in the universal messaging system described in the following co-pending, commonly assigned patent applications, each of which also is hereby incorporated by reference in its entirety:

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients";

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients";

U.S. patent application Ser. No. 09/094,266, filed Jun. 9, 1998, titled "Universal Messaging System Providing Integrated Voice, Data and Fax Messaging Services to PC/Web-based Clients, Including a Large Object Server for Efficiently Distributing Voice/Fax Messages to Web-based Clients"; and U.S. patent application Ser. No. 09/094,026, filed Jun. 9, 1998, "System and Method for Integrating Notification Functions of Two Messaging Systems in a Universal Messaging Solution".

The universal messaging system described in these applications integrates a voice and fax messaging capability with an e-mail messaging capability and provides an interface through which users can access the system via a telephone handset. The present invention can be implemented in this system by adding the above-described functionality of the cache 40, the controller 42, and the text-to-speech converter 38.

Aspects of the method and apparatus of the present invention, particularly the functionality of the controller 42, may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. These aspects of the present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level procedural or object-oriented programming language, such as, for example, C, C++, or Java. Alternatively, the program code may be implemented in assembly or machine language. In any case, the language may be a compiled or an interpreted language.

As the foregoing illustrates, the present invention is directed to a method, apparatus, and computer program product for reducing the load on a text-to-speech converter in a messaging system capable of text-to-speech conversion of e-mail messages. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A messaging system comprising:
   an interface that provides access to the system from a telephone handset;
   a storage unit for storing e-mail messages, wherein each e-mail message comprises a plurality of different text segments;
   a text-to-speech converter for converting the text segments of an e-mail message into speech signals for playback to a user over a telephone handset; and
   a cache for storing the speech signals of selected ones of previously converted text segments, wherein upon a request by a user to convert the text segments of a new e-mail message to speech signals for playback via a telephone handset, the speech signals of previously converted text segments that are identical to any text segments of the new e-mail message are played back from the cache thus avoiding the need for the text-to-speech converter to convert those text segments of the new e-mail message to speech and wherein said selected ones of previously converted message body text segments comprise message body text segments having a length that is equal to or lesser than a specified predetermined maximum length.

2. A messaging system comprising:
   an interface that provides access to the system from a telephone handset;
   a storage unit for storing e-mail messages, wherein each e-mail message comprises a plurality of different text segments;
   a text-to-speech converter for converting the text segments of an e-mail message into speech signals for playback to user over a telephone handset; and a cache for storing the speech signals of selected ones of previously converted text segments, wherein upon a request by a user to convert the text segments of a new e-mail message to speech signals for playback via a telephone handset, the speech signals of previously converted text segments that are identical to any text segments of the new e-mail message are played back from the cache thus avoiding the need for the text-to-speech converter to convert those text segments of the new e-mail message to speech, wherein said selected ones of previously converted message body text segments comprise message body text segments having a length that is equal to or lesser than a predetermined maximum length and wherein said predetermined maximum length is forty (40) characters.

3. A messaging system comprising:

an interface that provides access to the system from a telephone handset;

a storage unit for storing e-mail messages, wherein each e-mail message comprises a plurality of different text segments;

a text-to-speech converter for converting the text segments of an e-mail message into speech signals for playback to user over a telephone handset; and a cache for storing the speech signals of selected ones of previously converted text segments, wherein upon a request by a user to convert the text segments of a new e-mail message to speech signals for playback via a telephone handset, the speech signals of previously converted text segments that are identical to any text segments of the new e-mail message are played back from the cache thus avoiding the need for the text-to-speech converter to convert those text segments of the new e-mail message to speech, wherein each e-mail message comprises a TO segment identifying a sender of the e-mail message, a FROM segment identifying a recipient of the e-mail message, a CC segment identifying a person that has been copied on the e-mail message, a RE segment identifying the subject of the e-mail message, and a MESSAGE segment comprising a body of the e-mail message, and wherein said selected ones of previously converted text segments comprises all TO, FROM, CC, and RE segments and wherein each MESSAGE segment comprises one or more sentences, and wherein each sentence of each MESSAGE segment comprises a separate text segment, and further wherein said selected ones of previously converted text segments further comprises each sentence of each MESSAGE segment.

4. The apparatus recited in claim 3, wherein said selected ones of previously converted text segments further comprises any MESSAGE segments having a length that is equal to or lesser than a specified predetermined maximum length.

5. A method for use in a messaging system that comprises a storage unit for storing e-mail messages, each comprising a plurality of different text segments, and a text-to-speech converter for converting the text segments of an e-mail message into speech signals for playback to a user via a telephone handset, said method comprising:

storing the speech signals of selected ones of previously converted text message segments in a cache;

receiving a request from a user to convert the text segments of a new e-mail message to speech signals for playback to the user over a telephone handset;

comparing a text segment of the new e-mail message to the previously converted text segments for which speech signals are stored in the cache; and if one of said previously converted text segments matches the text segment of the new e-mail message, playing back the stored speech signal for the previously converted text segment from the cache instead of performing a text-to-speech conversion on the text segment of the new e-mail message;

wherein said storing step comprises storing the speech signals of converted text message segments having a length that is equal to or lesser than a specified predetermined maximum length wherein the maximum length applies only to a message body text segment.

6. A method for use in a messaging system that comprises a storage unit for storing e-mail messages, each comprising a plurality of different text segments, and a text-to-speech converter for converting the text segments of an e-mail message into speech signals for playback to a user via a telephone handset, said method comprising:

storing the speech signals of selected ones of previously converted text message segments in a cache;

receiving a request from a user to convert the text segments of a new e-mail message to speech signals for playback to the user over a telephone handset;

comparing a text segment of the new e-mail message to the previously converted text segments for which speech signals are stored in the cache; and if one of said previously converted text segments matches the text segment of the new e-mail message, playing back the stored speech signal for the previously converted text segment from the cache instead of performing a text-to-speech conversion on the text segment of the new e-mail message;

wherein said storing step comprises storing the speech signals of converted text message segments having a length that is equal to or lesser than a predetermined maximum length and wherein said predetermined maximum length is forty (40) characters wherein the maximum length applies only to a message body text segment.

7. The method recited in claim 5, wherein each e-mail message comprises a TO segment identifying a sender of the e-mail message, a FROM segment identifying a recipient of the e-mail message, a CC segment identifying a person that has been copied on the e-mail message, a RE segment identifying the subject of the e-mail message, and a MESSAGE segment comprising a body of the e-mail message, and wherein said storing step comprises storing the speech signals of all TO, FROM, CC, and RE segments, wherein each MESSAGE segment comprises one or more sentences, and wherein each sentence of each MESSAGE segment comprises a separate text segment, and further wherein said storing step further comprises storing the speech signals of each sentence of each MESSAGE segment, separately.

8. The method recited in claim 7, further comprising the step of discarding the stored speech signals of the longest sentences as the cache becomes full in order to make space available for caching the speech signals of newer sentences of shorter length.

9. The method recited in claim 8, wherein said discarding step is based on a least recently used algorithm in addition to sentence length.

10. A computer-readable medium having program code stored thereon for use in a messaging system that comprises a storage unit for storing e-mail messages, each comprising a plurality of different text segments, and a text-to-speech converter for converting the text segments of an e-mail message into speech signals for playback to a user via a telephone handset, said program code, when executed by a controller, causing the controller to perform the following steps:
- store the speech signals of selected ones of previously converted text message segments in a cache;
- receive a request from a user to convert the text segments of a new e-mail message to speech signals for playback to the user over a telephone handset;
- compare a text segment of the new e-mail message to the previously converted text segments for which speech signals are stored in the cache; and
- if one of said previously converted text segments matches the text segment of the new e-mail message, play back the stored speech signal for the previously converted text segment from the cache instead of performing a text-to-speech conversion on the text segment of the new e-mail message, wherein said program code causes only the speech signals of converted text message segments having a length that is equal to or lesser than a specified predetermined maximum length to be stored in the cache wherein the maximum length applies only to a message body text segment.

11. A computer-readable medium having program code stored thereon for use in a messaging system that comprises a storage unit for storing e-mail messages, each comprising a plurality of different text segments, and a text-to-speech converter for converting the text segments of an e-mail message into speech signals for playback to a user via a telephone handset, said program code, when executed by a controller, causing the controller to perform the following steps:
- store the speech signals of selected ones of previously converted text message segments in a cache;
- receive a request from a user to convert the text segments of a new e-mail message to speech signals for playback to the user over a telephone handset;
- compare a text segment of the new e-mail message to the previously converted text segments for which speech signals are stored in the cache; and
- if one of said previously converted text segments matches the text segment of the new e-mail message, play back the stored speech signal for the previously converted text segment from the cache instead of performing a text-to-speech conversion on the text segment of the new e-mail message, wherein said program code causes only the speech signals of converted text message segments having a length that is equal to or lesser than a predetermined maximum length to be stored in the cache and wherein said predetermined maximum length is forty (40) characters wherein the maximum length applies only to a message body text segment.

12. A computer-readable medium having program code stored thereon for use in a messaging system that comprises a storage unit for storing e-mail messages, each comprising for plurality of different text segments, and a text-to-speech converter for converting the text segments of an e-mail message into speech signals for playback to a user via a telephone handset, said program code, when executed by a controller, causing the controller to perform the following steps:
- store the speech signals of selected ones of previously converted text message segments in a cache;
- receive a request from a user to convert the text segments of a new e-mail message to speech signals for playback to the user over a telephone handset;
- compare a text segment of the new e-mail message to the previously converted text segments for which speech signals are stored in the cache; and
- if one of said previously converted text segments matches the text segment of the new e-mail message, play back the stored speech signal for the previously converted text segment from the cache instead of performing a text-to-speech conversion on the text segment of the new e-mail message, wherein each e-mail message comprises a TO segment identifying a sender of the e-mail message, a FROM segment identifying a recipient of the e-mail message, a CC segment identifying a person that has been copied on the e-mail message, a RE segment identifying the subject of the e-mail message, and a MESSAGE segment comprising a body of the e-mail message, and wherein said program code causes the speech signals of all TO, FROM, CC, and RE segments to be stored in the cache, wherein each MESSAGE segment comprises one or more sentences, and wherein each sentence of each MESSAGE segment comprises a separate text segment, and further wherein said program code causes the speech signals of each sentence of each MESSAGE segment to be stored separately in the cache.

13. The computer-readable medium recited in claim 12, wherein said program code causes the stored speech signals of the longest sentences to be discarded as the cache becomes full in order to make space available for caching the speech signals of newer sentences of shorter length.

14. The computer-readable medium recited in claim 13, wherein said program code causes the stored speech signals to be discarded based upon a combination of sentence length and a least recently used algorithm.

* * * * *